United States Patent
Todd et al.

(10) Patent No.: US 7,686,080 B2
(45) Date of Patent: Mar. 30, 2010

(54) ACID-GENERATING FLUID LOSS CONTROL ADDITIVES AND ASSOCIATED METHODS

(75) Inventors: Bradley L. Todd, Duncan, OK (US); David E. McMechan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 97 days.

(21) Appl. No.: 11/598,150

(22) Filed: Nov. 9, 2006

(65) Prior Publication Data

US 2008/0139415 A1    Jun. 12, 2008

(51) Int. Cl.
*E21B 43/00* (2006.01)
*E21B 43/26* (2006.01)
(52) U.S. Cl. .................. 166/279; 166/305.1; 166/308.1
(58) Field of Classification Search ................. None
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Palmer ...................... 260/78.3 |
| 3,173,484 A | 3/1965 | Huitt et al. ............... 166/280.1 |
| 3,195,635 A | 7/1965 | Fast ........................ 166/280.1 |
| 3,272,650 A | 9/1966 | MacVittie ...................... 134/7 |
| 3,302,719 A | 2/1967 | Fischer .................... 166/280.2 |
| 3,364,995 A | 1/1968 | Atkins et al. ............. 166/280.1 |
| 3,366,178 A | 1/1968 | Malone et al. ............ 166/280.1 |
| 3,455,390 A | 7/1969 | Gallus ........................ 166/295 |
| 3,784,585 A | 1/1974 | Schmitt et al. .............. 260/861 |
| 3,819,525 A | 6/1974 | Hattenbrun ................. 252/132 |
| 3,828,854 A | 8/1974 | Templeton et al. .......... 166/307 |
| 3,836,465 A | 9/1974 | Rhudy et al. |
| 3,868,998 A | 3/1975 | Lybarger et al. ............. 166/278 |
| 3,912,692 A | 10/1975 | Casey et al. ................. 260/78.3 |
| 3,948,672 A | 4/1976 | Harnsberger ................. 106/90 |
| 3,955,993 A | 5/1976 | Curtice ........................ 106/90 |
| 3,960,736 A | 6/1976 | Free et al. ................... 252/8.55 |
| 3,968,840 A | 7/1976 | Tate ........................ 166/280.1 |
| 3,986,355 A | 10/1976 | Klaeger |
| 3,998,272 A | 12/1976 | Maly .......................... 166/281 |
| 3,998,744 A | 12/1976 | Arnold et al. ................ 507/269 |
| 4,010,071 A | 3/1977 | Colegrove |
| 4,068,718 A | 1/1978 | Cooke, Jr. et al. ......... 166/280.2 |
| 4,169,798 A | 10/1979 | DeMartino ............. 252/8.55 R |
| 4,172,066 A | 10/1979 | Zweigle et al. ....... 260/29.6 TA |
| 4,261,421 A | 4/1981 | Watanabe ................... 166/281 |
| 4,265,673 A | 5/1981 | Pace et al. |
| 4,299,825 A | 11/1981 | Lee |
| 4,387,769 A * | 6/1983 | Erbstoesser et al. ......... 507/219 |
| 4,460,052 A | 7/1984 | Gockel ........................ 175/72 |
| 4,470,915 A | 9/1984 | Conway ................. 252/8.55 R |
| 4,498,995 A | 2/1985 | Gockel .................. 252/8.5 LC |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. ..... 252/8.55 R |
| 4,632,876 A | 12/1986 | Laird et al. |
| 4,694,905 A | 9/1987 | Armbruster ................. 166/280 |
| 4,715,967 A | 12/1987 | Bellis ....................... 252/8.551 |
| 4,716,964 A | 1/1988 | Erbstoesser et al. ......... 166/284 |
| 4,767,706 A | 8/1988 | Levesque |
| 4,772,346 A | 9/1988 | Anderson et al. |
| 4,785,884 A | 11/1988 | Armbruster ................. 166/280 |
| 4,793,416 A | 12/1988 | Mitchell |
| 4,797,262 A | 1/1989 | Dewitz ....................... 422/142 |
| 4,809,783 A | 3/1989 | Hollenbeck et al. ......... 166/307 |
| 4,817,721 A | 4/1989 | Pober ......................... 166/295 |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. .................... 524/555 |
| 4,848,467 A | 7/1989 | Cantu et al. ................. 166/281 |
| 4,863,980 A | 9/1989 | Cowan et al. |
| 4,886,354 A | 12/1989 | Welch et al. .................. 356/70 |
| 4,894,231 A | 1/1990 | Moreau et al. |
| 4,957,165 A | 9/1990 | Cantu et al. ................. 166/295 |

(Continued)

FOREIGN PATENT DOCUMENTS

EP    0 510 762 A2    10/1992

(Continued)

OTHER PUBLICATIONS

Kiyoshi Matsuyama et al, Environmentally benign formation of polymeric microspheres by rapid expansion of supercritical carbon dioxide solution with a nonsolvent, Environ Sci Technol2001, 35, 4149-4155.

(Continued)

*Primary Examiner*—Zakiya W Bates
*Assistant Examiner*—Angela M DiTrani
(74) *Attorney, Agent, or Firm*—Robert A. Kent; McDermott Will & Emery LLP

(57) ABSTRACT

Many methods are provided herein including a method of providing fluid loss control comprising: providing a treatment fluid; adding to the treatment fluid an acid-generating fluid loss control additive comprising an acid-generating component wherein the acid-generating fluid loss control additive forms droplets in the treatment fluid; and placing the treatment fluid into a subterranean formation. Other methods are provided as well.

14 Claims, 1 Drawing Sheet

U.S. PATENT DOCUMENTS

Figure 1:
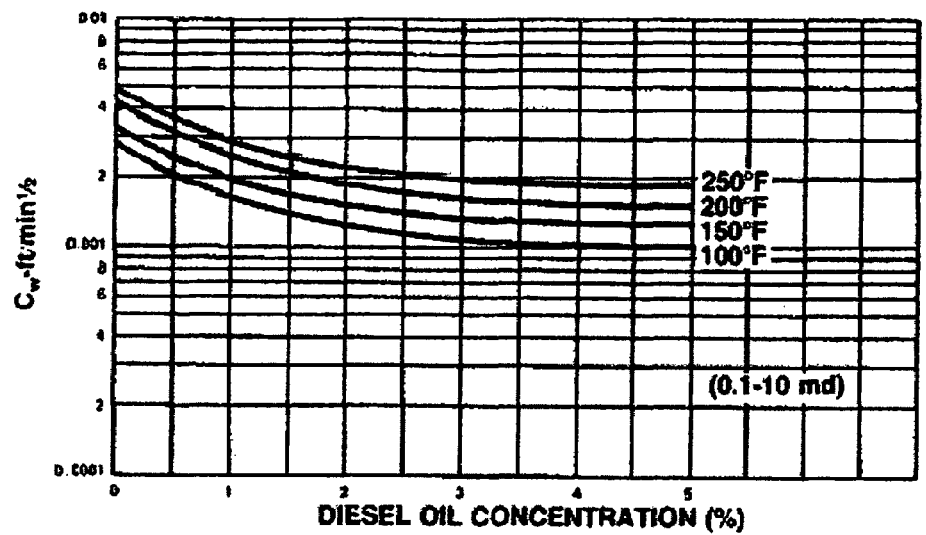

| | | | |
|---|---|---|---|
| 4,961,466 A | 10/1990 | Himes et al. ............... 166/250 |
| 4,982,793 A | 1/1991 | Holtmyer et al. ......... 166/305.1 |
| 4,986,353 A | 1/1991 | Clark et al. ............... 166/279 |
| 4,986,354 A | 1/1991 | Cantu et al. ............... 166/279 |
| 4,986,355 A | 1/1991 | Casad et al. ............... 166/295 |
| 5,034,139 A | 7/1991 | Reid et al. |
| 5,067,565 A | 11/1991 | Holtmyer et al. ......... 166/305.1 |
| 5,082,056 A | 1/1992 | Tackett, Jr. ............... 166/295 |
| 5,122,549 A | 6/1992 | Holtmyer et al. ............ 523/130 |
| 5,142,023 A | 8/1992 | Gruber et al. ............... 528/354 |
| 5,152,781 A | 10/1992 | Tang et al. |
| 5,161,615 A | 11/1992 | Hutchins et al. |
| 5,203,834 A | 4/1993 | Hutchins et al. |
| 5,213,446 A | 5/1993 | Dovan |
| 5,216,050 A | 6/1993 | Sinclair ....................... 524/108 |
| 5,247,059 A | 9/1993 | Gruber et al. ............... 528/354 |
| 5,249,628 A | 10/1993 | Surjaatmadja .............. 166/305 |
| 5,251,697 A | 10/1993 | Shuler |
| 5,295,542 A | 3/1994 | Cole et al. ................... 166/278 |
| 5,304,620 A | 4/1994 | Holtmyer et al. |
| 5,314,031 A | 5/1994 | Hale et al. |
| 5,325,923 A | 7/1994 | Surjaatmadja et al. ...... 166/308 |
| 5,330,005 A | 7/1994 | Card et al. .................. 166/280 |
| 5,359,026 A | 10/1994 | Gruber ....................... 528/354 |
| 5,360,068 A | 11/1994 | Sprunt et al. ............... 166/259 |
| 5,363,916 A | 11/1994 | Himes et al. ............... 166/276 |
| 5,373,901 A | 12/1994 | Norman et al. ............. 166/300 |
| 5,386,874 A | 2/1995 | Laramay et al. ............ 166/300 |
| 5,396,957 A | 3/1995 | Surjaatmadja et al. ...... 166/308 |
| 5,402,846 A | 4/1995 | Jennings, Jr. et al. ........ 166/259 |
| 5,413,178 A | 5/1995 | Walker et al. .............. 166/300 |
| 5,439,055 A | 8/1995 | Card et al. .................. 166/280 |
| 5,460,226 A | 10/1995 | Lawton et al. .............. 166/300 |
| 5,464,060 A | 11/1995 | Hale et al. .................. 166/293 |
| 5,475,080 A | 12/1995 | Gruber et al. ............... 528/354 |
| 5,484,881 A | 1/1996 | Gruber et al. ............... 528/354 |
| 5,487,897 A | 1/1996 | Polson et al. |
| 5,492,177 A | 2/1996 | Yeh et al. |
| 5,496,557 A | 3/1996 | Feijen et al. |
| 5,497,830 A | 3/1996 | Boles et al. ................. 166/300 |
| 5,499,678 A | 3/1996 | Surjaatmadja et al. ...... 166/298 |
| 5,501,276 A | 3/1996 | Weaver et al. |
| 5,505,787 A | 4/1996 | Yamaguchi ..................... 134/4 |
| 5,512,071 A | 4/1996 | Yam et al. ..................... 51/307 |
| 5,536,807 A | 7/1996 | Gruber et al. ............... 528/354 |
| 5,555,936 A | 9/1996 | Pirri et al. |
| 5,591,700 A | 1/1997 | Harris et al. ................ 507/204 |
| 5,594,095 A | 1/1997 | Gruber et al. ............... 528/354 |
| 5,602,083 A | 2/1997 | Gabrysch et al. |
| 5,604,186 A | 2/1997 | Hunt et al. .................. 507/204 |
| 5,607,905 A | 3/1997 | Dobson, Jr. et al. ......... 507/211 |
| 5,613,558 A | 3/1997 | Dillenbeck |
| 5,670,473 A | 9/1997 | Scepanski ................... 510/445 |
| 5,697,440 A | 12/1997 | Weaver et al. |
| 5,698,322 A | 12/1997 | Tsai et al. ................... 428/373 |
| 5,723,416 A | 3/1998 | Liao |
| 5,759,964 A | 6/1998 | Shuchart et al. ............ 507/209 |
| 5,765,642 A | 6/1998 | Surjaatmadja .............. 166/297 |
| 5,783,527 A | 7/1998 | Dobson, Jr. et al. |
| 5,791,415 A | 8/1998 | Nguyen et al. .............. 166/280 |
| 5,799,734 A | 9/1998 | Normal et al. |
| 5,833,000 A | 11/1998 | Weaver et al. ............. 166/276 |
| 5,849,401 A | 12/1998 | El-Afandi et al. .......... 428/215 |
| 5,853,048 A | 12/1998 | Weaver et al. ............. 166/279 |
| 5,893,416 A | 4/1999 | Read ............................ 166/304 |
| 5,908,073 A | 6/1999 | Nguyen et al. .............. 166/276 |
| 5,916,849 A | 6/1999 | House |
| 5,924,488 A | 7/1999 | Nguyen et al. .............. 166/280 |
| 5,964,291 A | 10/1999 | Bourne et al. ............... 166/279 |
| 5,977,030 A | 11/1999 | House |
| 5,979,557 A | 11/1999 | Card et al. |
| 5,996,693 A | 12/1999 | Heathman |
| 6,004,400 A | 12/1999 | Bishop et al. ................... 134/2 |
| 6,024,170 A | 2/2000 | McCabe et al. ............. 166/300 |
| 6,028,113 A | 2/2000 | Scepanski .................... 514/643 |
| 6,047,772 A | 4/2000 | Weaver et al. .............. 166/276 |
| 6,110,875 A | 8/2000 | Tjon-Joe-Pin et al. |
| 6,114,410 A | 9/2000 | Betzold ....................... 523/130 |
| 6,123,159 A | 9/2000 | Brookey et al. |
| 6,123,965 A | 9/2000 | Jacob et al. ................. 424/489 |
| 6,131,661 A | 10/2000 | Conner et al. ............... 166/300 |
| 6,135,987 A | 10/2000 | Tsai et al. .................... 604/365 |
| 6,143,698 A | 11/2000 | Murphey et al. ............ 507/145 |
| 6,148,917 A | 11/2000 | Brookey et al. |
| 6,162,766 A | 12/2000 | Muir et al. ................... 507/267 |
| 6,169,058 B1 | 1/2001 | Le et al. ...................... 507/222 |
| 6,172,011 B1 | 1/2001 | Card et al. ................... 507/204 |
| 6,189,615 B1 | 2/2001 | Sydansk ...................... 166/270 |
| 6,202,751 B1 | 3/2001 | Chatterji et al. ............. 166/276 |
| 6,209,643 B1 | 4/2001 | Nguyen et al. .............. 166/276 |
| 6,209,646 B1 | 4/2001 | Reddy et al. ................ 166/300 |
| 6,214,773 B1 | 4/2001 | Harris et al. |
| 6,242,390 B1 | 6/2001 | Mitchell et al. ............. 507/211 |
| 6,260,622 B1 | 7/2001 | Blok et al. ................ 166/305.1 |
| 6,291,013 B1 | 9/2001 | Gibson et al. ............. 427/213.3 |
| 6,300,286 B1 | 10/2001 | Dobson, Jr. et al. |
| 6,302,209 B1 | 10/2001 | Thompson et al. |
| 6,308,788 B1 | 10/2001 | Patel et al. |
| 6,311,773 B1 | 11/2001 | Todd et al. .................. 166/280 |
| 6,323,307 B1 | 11/2001 | Bigg et al. ................... 528/354 |
| 6,326,458 B1 | 12/2001 | Gruber et al. ............... 528/354 |
| 6,328,105 B1 | 12/2001 | Betzold ....................... 166/280 |
| 6,330,917 B2 | 12/2001 | Chatterji et al. |
| 6,357,527 B1 | 3/2002 | Norman et al. ............. 166/300 |
| 6,364,945 B1 | 4/2002 | Chatterji et al. ............. 106/677 |
| 6,380,138 B1 | 4/2002 | Ischy et al. .................. 507/204 |
| 6,387,986 B1 | 5/2002 | Moradi-Araghi et al. .... 523/211 |
| 6,390,195 B1 | 5/2002 | Nguyen et al. .............. 166/276 |
| 6,394,185 B1 | 5/2002 | Constien ..................... 166/296 |
| 6,422,314 B1 | 7/2002 | Todd et al. .................. 166/312 |
| 6,422,326 B1 | 7/2002 | Brookey et al. |
| 6,432,155 B1 | 8/2002 | Swazey et al. |
| 6,454,003 B1 | 9/2002 | Chang et al. ................ 166/270 |
| 6,485,947 B1 | 11/2002 | Rajgarhia et al. ........... 435/139 |
| 6,488,763 B2 | 12/2002 | Brothers et al. ............. 106/692 |
| 6,494,263 B2 | 12/2002 | Todd ........................... 166/312 |
| 6,508,305 B1 | 1/2003 | Brannon et al. ............. 166/293 |
| 6,509,301 B1 | 1/2003 | Vollmer et al. .............. 507/236 |
| 6,527,051 B1 | 3/2003 | Reddy et al. ................ 166/300 |
| 6,554,071 B1 | 4/2003 | Reddy et al. ................ 166/293 |
| 6,566,310 B2 | 5/2003 | Chan |
| 6,569,814 B1 | 5/2003 | Brady et al. ................. 507/201 |
| 6,578,630 B2 | 6/2003 | Simpson et al. |
| 6,599,863 B1 | 7/2003 | Palmer et al. ............... 507/219 |
| 6,667,279 B1 | 12/2003 | Hessert et al. ............... 507/225 |
| 6,669,771 B2 | 12/2003 | Tokiwa et al. ............. 106/162.7 |
| 6,681,856 B1 | 1/2004 | Chatterji et al. ............. 166/294 |
| 6,686,328 B1 | 2/2004 | Binder ........................ 510/446 |
| 6,691,780 B2 | 2/2004 | Nguyen et al. |
| 6,702,023 B1 | 3/2004 | Harris et al. ................. 166/307 |
| 6,710,019 B1 | 3/2004 | Sawdon et al. ............. 507/136 |
| 6,716,797 B2 | 4/2004 | Brookey |
| 6,737,385 B2 | 5/2004 | Todd et al. |
| 6,761,218 B2 | 7/2004 | Nguyen et al. .............. 166/278 |
| 6,763,888 B1 | 7/2004 | Harris et al. .............. 166/305.1 |
| 6,764,981 B1 | 7/2004 | Eoff et al. |
| 6,793,018 B2 | 9/2004 | Dawson et al. ............. 166/300 |
| 6,793,730 B2 | 9/2004 | Reddy et al. |
| 6,806,235 B1 | 10/2004 | Mueller et al. |
| 6,817,414 B2 | 11/2004 | Lee ............................. 166/278 |
| 6,818,594 B1 | 11/2004 | Freeman et al. |
| 6,837,309 B2 | 1/2005 | Boney et al. ............... 166/280.2 |
| 6,883,608 B2 | 4/2005 | Parlar et al. |
| 6,896,058 B2 | 5/2005 | Munoz, Jr. et al. .......... 166/279 |

| Patent/Pub No. | Date | Inventor | Class |
|---|---|---|---|
| 6,904,971 B2 | 6/2005 | Brothers et al. | |
| 6,949,491 B2 | 9/2005 | Cooke, Jr. | 507/219 |
| 6,959,767 B2 | 11/2005 | Horton et al. | |
| 6,978,838 B2 | 12/2005 | Parlar et al. | |
| 6,981,552 B2 | 1/2006 | Reddy et al. | |
| 6,983,801 B2 | 1/2006 | Dawson et al. | 166/300 |
| 6,987,083 B2 | 1/2006 | Phillippi et al. | |
| 6,997,259 B2 | 2/2006 | Nguyen | |
| 7,007,752 B2 | 3/2006 | Reddy et al. | |
| 7,021,337 B2 | 4/2006 | Markham | |
| 7,032,663 B2 | 4/2006 | Nguyen | 166/276 |
| 7,036,586 B2 | 5/2006 | Roddy et al. | |
| 7,036,587 B2 | 5/2006 | Munoz, Jr. et al. | 166/279 |
| 7,044,220 B2 | 5/2006 | Nguyen et al. | 166/279 |
| 7,044,224 B2 | 5/2006 | Nguyen | 166/292 |
| 7,063,151 B2 | 6/2006 | Nguyen et al. | |
| 7,066,258 B2 | 6/2006 | Justus et al. | 166/295 |
| 7,069,994 B2 | 7/2006 | Cooke, Jr. | |
| 7,080,688 B2 | 7/2006 | Todd et al. | 166/278 |
| 7,093,664 B2 | 8/2006 | Todd et al. | |
| 7,096,947 B2 | 8/2006 | Todd et al. | |
| 7,101,829 B2 | 9/2006 | Guichard et al. | |
| 7,131,491 B2 | 11/2006 | Blauch et al. | |
| 7,140,438 B2 | 11/2006 | Frost et al. | |
| 7,147,067 B2 | 12/2006 | Getzlaf et al. | |
| 7,151,077 B2 | 12/2006 | Prud'homme et al. | |
| 7,156,174 B2 | 1/2007 | Roddy et al. | |
| 7,165,617 B2 | 1/2007 | Lord et al. | |
| 7,168,489 B2 | 1/2007 | Frost et al. | |
| 7,172,022 B2 | 2/2007 | Reddy et al. | |
| 7,178,596 B2 | 2/2007 | Blauch et al. | 166/280 |
| 7,195,068 B2 | 3/2007 | Todd | |
| 7,204,312 B2 | 4/2007 | Roddy et al. | |
| 7,219,731 B2 | 5/2007 | Sullivan et al. | 166/278 |
| 7,228,904 B2 | 6/2007 | Todd et al. | |
| 7,256,159 B2 | 8/2007 | Guichard et al. | |
| 7,261,156 B2 | 8/2007 | Nguyen et al. | |
| 7,264,051 B2 | 9/2007 | Nguyen et al. | |
| 7,267,170 B2 | 9/2007 | Mang et al. | |
| 7,299,876 B2 | 11/2007 | Lord et al. | |
| 7,303,014 B2 | 12/2007 | Reddy et al. | |
| 7,306,037 B2 | 12/2007 | Nguyen et al. | |
| 7,322,412 B2 | 1/2008 | Badalamenti et al. | |
| 7,337,839 B2 * | 3/2008 | Ayoub et al. | 166/250.1 |
| 7,353,876 B2 | 4/2008 | Savery et al. | |
| 7,353,879 B2 | 4/2008 | Todd et al. | |
| 7,380,600 B2 * | 6/2008 | Willberg et al. | 166/280.1 |
| 7,413,017 B2 | 8/2008 | Nguyen et al. | |
| 7,448,450 B2 | 11/2008 | Luke et al. | |
| 7,455,112 B2 | 11/2008 | Moorehead et al. | |
| 7,461,697 B2 | 12/2008 | Todd et al. | |
| 7,475,728 B2 | 1/2009 | Pauls et al. | |
| 7,484,564 B2 | 2/2009 | Welton et al. | |
| 7,497,258 B2 | 3/2009 | Savery et al. | |
| 7,497,278 B2 | 3/2009 | Schriener et al. | |
| 7,506,689 B2 | 3/2009 | Surjaatmadja et al. | |
| 7,547,665 B2 | 6/2009 | Welton et al. | |
| 7,595,280 B2 | 9/2009 | Welton et al. | |
| 7,598,208 B2 | 10/2009 | Todd | |
| 7,608,566 B2 | 10/2009 | Saini et al. | |
| 7,608,567 B2 | 10/2009 | Saini | |
| 2001/0016562 A1 | 8/2001 | Muir et al. | 507/201 |
| 2002/0036088 A1 | 3/2002 | Todd | 166/300 |
| 2002/0119169 A1 | 8/2002 | Angel et al. | |
| 2002/0125012 A1 | 9/2002 | Dawson et al. | 166/300 |
| 2003/0054962 A1 | 3/2003 | England et al. | |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0147965 A1 | 8/2003 | Bassett et al. | |
| 2003/0188766 A1 | 10/2003 | Banerjee et al. | 134/7 |
| 2003/0230407 A1 | 12/2003 | Vijn et al. | |
| 2003/0234103 A1 | 12/2003 | Lee et al. | 166/293 |
| 2004/0014606 A1 | 1/2004 | Parlar et al. | |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0070093 A1 | 4/2004 | Mathiowitz et al. | 264/4 |
| 2004/0094300 A1 | 5/2004 | Sullivan et al. | 166/308.1 |
| 2004/0099416 A1 | 5/2004 | Vijn et al. | |
| 2004/0106525 A1 | 6/2004 | Willberg et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0162386 A1 | 8/2004 | Altes et al. | 524/806 |
| 2004/0170836 A1 | 9/2004 | Bond et al. | |
| 2004/0214724 A1 | 10/2004 | Todd et al. | |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | |
| 2005/0034861 A1 | 2/2005 | Saini et al. | |
| 2005/0034865 A1 | 2/2005 | Todd et al. | 166/304 |
| 2005/0034868 A1 | 2/2005 | Frost et al. | 166/307 |
| 2005/0045328 A1 | 3/2005 | Frost et al. | 166/278 |
| 2005/0051330 A1 | 3/2005 | Nguyen | 166/276 |
| 2005/0056423 A1 | 3/2005 | Todd et al. | 166/278 |
| 2005/0059556 A1 | 3/2005 | Munoz, Jr. et al. | 507/103 |
| 2005/0059557 A1 | 3/2005 | Todd et al. | 507/110 |
| 2005/0059558 A1 * | 3/2005 | Blauch et al. | 507/203 |
| 2005/0103496 A1 | 5/2005 | Todd et al. | 166/278 |
| 2005/0126780 A1 | 6/2005 | Todd et al. | 166/280 |
| 2005/0126785 A1 | 6/2005 | Todd | 166/307 |
| 2005/0130848 A1 | 6/2005 | Todd et al. | 166/276 |
| 2005/0161220 A1 * | 7/2005 | Todd et al. | 166/308.1 |
| 2005/0167104 A1 | 8/2005 | Roddy et al. | 166/279 |
| 2005/0167105 A1 | 8/2005 | Roddy et al. | 166/293 |
| 2005/0167107 A1 | 8/2005 | Roddy et al. | 166/277 |
| 2005/0183741 A1 | 8/2005 | Surjaatmadja et al. | 134/6 |
| 2005/0205258 A1 | 9/2005 | Reddy et al. | 166/292 |
| 2005/0205265 A1 | 9/2005 | Todd et al. | 166/376 |
| 2005/0205266 A1 | 9/2005 | Todd et al. | 166/376 |
| 2005/0252659 A1 | 11/2005 | Sullivan et al. | 166/280.1 |
| 2005/0272613 A1 | 12/2005 | Cooke, Jr. | 507/219 |
| 2005/0277554 A1 | 12/2005 | Blauch et al. | |
| 2006/0016596 A1 | 1/2006 | Pauls et al. | |
| 2006/0032633 A1 | 2/2006 | Nguyen | |
| 2006/0046938 A1 | 3/2006 | Harris et al. | |
| 2006/0048938 A1 | 3/2006 | Kalman | |
| 2006/0065397 A1 | 3/2006 | Nguyen et al. | |
| 2006/0105917 A1 | 5/2006 | Munoz, Jr. | 507/103 |
| 2006/0105918 A1 | 5/2006 | Munoz, Jr. et al. | |
| 2006/0108150 A1 | 5/2006 | Luke et al. | |
| 2006/0169182 A1 | 8/2006 | Todd et al. | |
| 2006/0169448 A1 | 8/2006 | Savery et al. | |
| 2006/0169450 A1 | 8/2006 | Mang et al. | 507/219 |
| 2006/0169452 A1 | 8/2006 | Savery et al. | |
| 2006/0169453 A1 | 8/2006 | Savery et al. | |
| 2006/0172893 A1 | 8/2006 | Todd et al. | |
| 2006/0172894 A1 | 8/2006 | Mang et al. | 507/200 |
| 2006/0172895 A1 | 8/2006 | Mang et al. | 507/219 |
| 2006/0185847 A1 | 8/2006 | Saini et al. | |
| 2006/0185848 A1 | 8/2006 | Surjaatmadja et al. | |
| 2006/0205608 A1 | 9/2006 | Todd | |
| 2006/0234873 A1 | 10/2006 | Ballard | |
| 2006/0243449 A1 | 11/2006 | Welton et al. | |
| 2006/0247135 A1 | 11/2006 | Welton et al. | |
| 2006/0254774 A1 | 11/2006 | Saini et al. | |
| 2006/0258543 A1 | 11/2006 | Saini | |
| 2006/0258544 A1 | 11/2006 | Saini | |
| 2006/0276345 A1 | 12/2006 | Todd et al. | |
| 2006/0283597 A1 | 12/2006 | Schriener et al. | 166/300 |

| | | | |
|---|---|---|---|
| 2007/0042912 | A1 | 2/2007 | Welton et al. |
| 2007/0049501 | A1 | 3/2007 | Saini et al. |
| 2007/0066492 | A1 | 3/2007 | Funkhouser et al. |
| 2007/0066493 | A1 | 3/2007 | Funkhouser et al. |
| 2007/0078063 | A1 | 4/2007 | Munoz, Jr. |
| 2007/0078064 | A1 | 4/2007 | Munoz et al. |
| 2007/0238623 | A1 | 10/2007 | Saini et al. |
| 2007/0281868 | A1 | 12/2007 | Pauls et al. |
| 2008/0026955 | A1 | 1/2008 | Munoz et al. |
| 2008/0026959 | A1 | 1/2008 | Munoz et al. |
| 2008/0026960 | A1 | 1/2008 | Munoz et al. |
| 2008/0027157 | A1 | 1/2008 | Munoz et al. |
| 2008/0070810 | A1 | 3/2008 | Mang |
| 2008/0169102 | A1 | 7/2008 | Carbajal et al. |
| 2009/0062157 | A1 | 3/2009 | Munoz et al. |
| 2009/0258798 | A1 | 10/2009 | Munoz |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| GB | 2 412 389 | 3/2004 |
| JP | 2004181820 A | 7/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

U.S. Appl. No. 10/650,101, filed Aug. 26, 2003, Todd, et al.
U.S. Appl. No. 10/864,061, filed Jun. 9, 2004, Blauch, et al.
U.S. Appl. No. 10/864,618, filed Jun. 9, 2004, Blauch et al.
U.S. Appl. No. 10/897,509, filed Jul. 23, 2004, Pauls, et al.
U.S. Appl. No. 10/915,024, filed Aug. 10, 2004, Nguyen.
U.S. Appl. No. 10/932,749, filed Sep. 2, 2004, Harris, et al.
U.S. Appl. No. 10/933,705, filed Sep. 3, 2004, Kalman.
U.S. Appl. No. 10/950,072, filed Sep. 24, 2004, Nguyen, et al.
U.S. Appl. No. 10/991,228, filed Nov. 17, 2004, Munoz, Jr., et al.
U.S. Appl. No. 10/991,248, filed Nov. 17, 2004, Munoz, Jr., et al.
U.S. Appl. No. 11/046,043, filed Jan. 28, 2005, Todd, et al.
U.S. Appl. No. 11/046,652, filed Jan. 28, 2005, Todd, et al.
U.S. Appl. No. 11/047,876, filed Jan. 31, 2005, Mang, et al.
U.S. Appl. No. 11/048,417, filed Jan. 31, 2005, Mang, et al.
U.S. Appl. No. 11/049,600, filed Feb. 2, 2005, Mang, et al.
U.S. Appl. No. 11/062,943, filed Feb. 22, 2005, Saini, et al.
U.S. Appl. No. 11/062,956, filed Feb. 22, 2005, Surjaatmadja, et al.
U.S. Appl. No. 11/147,093, filed Jun. 7, 2005, Todd, et al.
U.S. Appl. No. 11/128,060, filed May 12, 2005, Saini.
U.S. Appl. No. 11/127,583, filed May 12, 2005, Saini.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society for Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Hallburton Communications.
Y. Chiang et al., *HYdrolysis Of Ortho Esters: Further Investigation Of The Factors Which Control The Rate-Determining Step*, Engineering Information, Inc, NY, NY, vol. 105, No. 23 (XP-002322842), Nov. 16, 1983.
M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.
Skrabal et al, *The Hydrolysis Rate Of Orthoformic Acid Ethyl Ether*, Chemical Institute of the University of Graz, Jan. 13, 1921, pp. 1-38, Jan. 13, 1921.
Heller, et al., *Poly(ortho esters)—From Concept To Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46).
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

NatureWorks Product Bulletin entitled NatureWorks PLA Polymer 3001D, Injection Molding Process Guide, 2005.

NatureWorks Product Bulletin entitled NatureWorks PLA Polymer 4060D, For Heat Seal Layer in Coextruded Oriented Films, 2005.

NatureWorks article entitled NatureWorks, Crystallizing and Drying of PLA, 2005.

\* cited by examiner

ACID-GENERATING FLUID LOSS CONTROL ADDITIVES AND ASSOCIATED METHODS

BACKGROUND OF THE INVENTION

The present invention relates to methods and compositions for treating subterranean formations, and more specifically, to acid-generating fluid loss control additives that are useful in petroleum recovery operations including fracturing.

Providing effective fluid-loss control for well treatment fluids is highly desirable. A "treatment fluid" is a fluid used in a subterranean application for any purpose. The term "treatment" as used herein does not imply any particular action by the fluid or any component thereof. Fluid-loss control materials are often added to treatment fluids to aid in fluid loss control. These are additives that are generally designed to lower the volume of a filtrate that passes through a filter medium, e.g., permeable rock or a filter cake. Most attain their fluid-loss control from the presence of solvent-specific solids, or from polymers that rely on filter cake buildup and on viscoelasticity to inhibit flow into and through the formation. A variety of fluid-loss control materials have been used and evaluated, including foams, oil-soluble resins, acid-soluble particulates, graded salt slurries, linear viscoelastic polymers, and heavy metal-crosslinked polymers. Their respective comparative effects are well documented.

Another technique that has been developed to control fluid loss includes the addition of a hydrocarbon-based fluid (also referred to generically as an "oil") to the treatment fluid in small droplets. The droplets are dispersed within the treatment fluid in an amount usually around about 1% to 5% by volume. Diesel is a common example. Other light hydrocarbons have been used as well. The droplets of the hydrocarbon-based fluid are thought to reduce the permeability of the polymer build-up in the filter cake. The oil droplets are thought to occupy space in the filter cake, but do not go into the rock to plug pore throats therein. The addition of approximately 2% to about 5% of an oil to a treatment fluid can lead to significant decreases in the amount of leak off of the treatment fluid. FIG. 1 illustrates fluid loss versus diesel oil concentration as an example. Although a reduction in fluid loss can be achieved using these methods, they also have many drawbacks. Oil droplets do not help clean up the filter cake, and may in fact, prevent or inhibit some breakers (such as oxidizers) from cleaning up the filter cake. Additionally, in a dry gas reservoir for example, the oil may become a third phase, which can damage the permeability of the formation to gas.

SUMMARY OF THE INVENTION

The present invention relates to methods and compositions for treating subterranean formations, and more specifically, to acid-generating fluid loss control additives that are useful in petroleum recovery operations including fracturing.

In one embodiment, the present invention provides a method of providing fluid loss control comprising: providing a treatment fluid; adding to the treatment fluid an acid-generating fluid loss control additive comprising an acid-generating component wherein the acid-generating fluid loss control additive forms droplets in the treatment fluid; and placing the treatment fluid into a subterranean formation.

In another embodiment, the present invention provides a method of comprising: providing a fracturing fluid that comprises an aqueous base fluid, a gelling agent, proppant particulates, and at least a plurality of droplets of acid-generating fluid loss control additives; and placing the fracturing fluid into a subterranean formation at a pressure sufficient to create or enhance a fracture therein.

In another embodiment, the present invention provides a method of degrading a filter cake comprising: providing a treatment fluid that comprises an aqueous base fluid and at least a plurality of droplets of acid-generating fluid loss control additives; placing the treatment fluid into a subterranean formation; allowing the droplets of the acid-generating fluid loss control additive to become incorporated into at least a portion of a filter cake in the subterranean formation; allowing the acid-generating fluid loss control additives to generate an acid; and allowing the acid to degrade an acid soluble degradable portion of the filter cake.

The features and advantages of the present invention will be readily apparent to those skilled in the art upon a reading of the description of the preferred embodiments, which follows.

DRAWINGS

Figure 2:
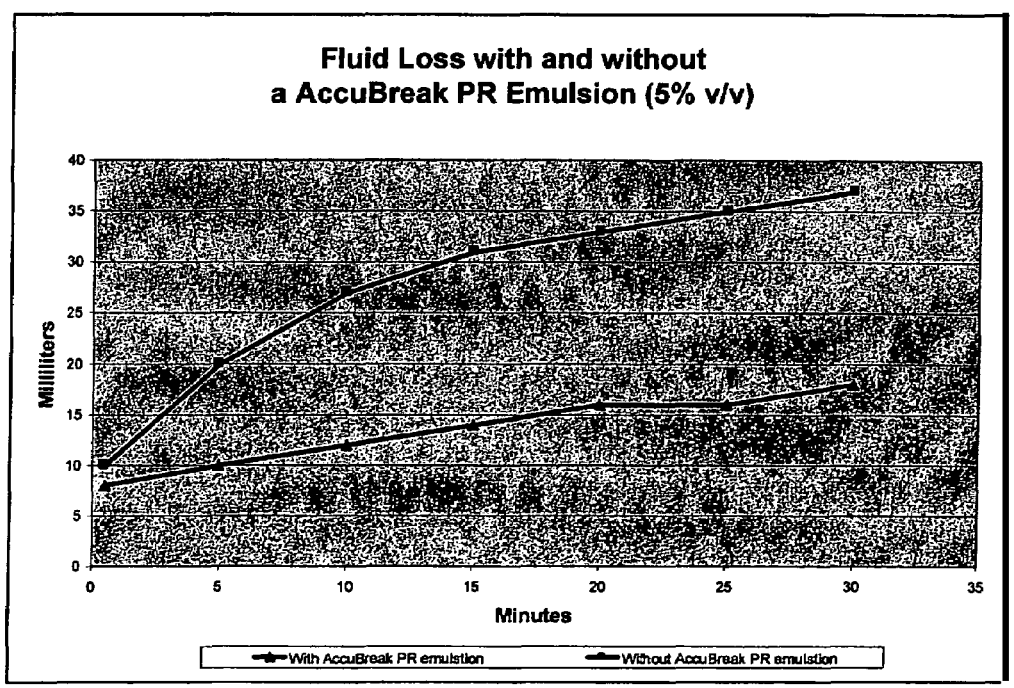

A more complete understanding of the present disclosure and advantages thereof may be acquired by referring to the following description taken in conjunction with the accompanying drawings, wherein:

FIG. 1 illustrates fluid loss versus diesel oil concentration.
FIG. 2 illustrates data discussed in the examples section.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

DESCRIPTION OF PREFERRED EMBODIMENTS

The present invention relates to methods and compositions for treating subterranean formations, and more specifically, to acid-generating fluid loss control additives that are useful in petroleum recovery operations including fracturing.

The acid-generating fluid loss control additives of the present invention may be added to any treatment fluid in such a way that the acid-generating fluid loss control additives form droplets within the treatment fluid. The term "droplet" as used herein refers to small dispersed, discrete, substantially immiscible drops within a treatment fluid. The size of the droplets may be important for a given application, and therefore, one should take the size of the droplets into consideration when designing the treatment. In some instances, smaller droplets, e.g., less than 500 microns, may be useful, and in some instances, those that are less than 100 microns may be even more useful. Generally speaking, coalescence into larger droplets may reduce the effectiveness of the droplets as a fluid loss control additive. For instance, it may become more difficult to incorporate them into a filter cake. The droplet size may be affected by choosing appropriate surfactants, as recognized by one skilled in the art with the benefit of this disclosure.

The acid-generating fluid loss control additives of the present invention may become incorporated within a filter cake in a subterranean formation and provide fluid loss control, and later may act as a delayed breaker for the filter cake.

In addition to providing fluid loss control, one of the many advantages of the present invention is that the acid-generating fluid loss control additives of the present invention is that they can assist in degrading filter cakes that are present in the subterranean formation, e.g., those that result from fracturing fluids that build filter cakes on permeable formation surfaces. This may be especially beneficial when, for example, the filter cake has a high concentration of polymer, e.g., guar. This is advantageous because if a sufficient amount of breaker to break that polymer in the filter cake is added to a treatment fluid, the fluid will prematurely break, which is undesirable. Additionally, when the droplets become incorporated in the pore throats of the formation, the droplets may go from being substantially water-immiscible to substantially water-miscible when the degrade. Before degradation, they offer resistance to flow. After degradation, they do not impede flow because they are substantially miscible in water or the treatment fluid.

The acid-generating fluid loss control additives of the present invention may be added to any treatment fluid in which it is desirable to control fluid loss. Examples include fracturing fluids, drill-in fluids, gravel pack fluids, and fluid loss control pills. Hydraulic fracturing operations are stimulation techniques that generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant," that are deposited in the fractures. The proppant particulates, inter alia, prevent the fractures from fully closing upon the release of hydraulic pressure, forming conductive channels through which fluids may flow to the well bore. Once at least one fracture is created or enhanced and the proppant particulates are substantially in place, the fracturing fluid may be "broken" (i.e., the viscosity is reduced), and the fracturing fluid may be recovered from the formation. Any fracturing fluid that is suitable for use in subterranean formations may be used in conjunction with the present invention.

The acid-generating fluid loss control additives of the present invention comprise an acid-generating component. Suitable acid generating components include esters; and ortho ethers (that may be referred to as ortho esters). Poly (ortho ethers) (that may be referred to as poly(ortho esters)); aliphatic polyesters; lactides, poly(lactides); glycolides; poly (glycolides); lactones; poly(ε-caprolactones); poly(hydroxybutyrates); anhydrides; poly(anhydrides); and poly(amino acids) may also be suitable if dissolved in an appropriate solvent that does negatively impact the subterranean formation in which they be used (e.g., they do not create an additional clean up hindrance). Derivatives and combinations of these may be suitable as well. The term "derivative" is defined herein to include any compound that is made from the base compound, for example, by replacing one atom in the base compound with another atom or group of atoms. One example of a suitable combination of acid-generating components includes a blend of an ester and an ortho ether. The acid-generating component also may comprise an esterase enzyme if desired. It is within the ability of one skilled in the art, with the benefit of this disclosure, to select a suitable acid-generating component. When used in the present invention, a preferable result is achieved if the acid-releasing degradable material degrades slowly over time as opposed to instantaneously. Preferably, these fluid loss additives are added in liquid form to the treatment fluid to form droplets within the treatment fluid.

Certain pH adjusters may be included to affect the degradation time of the acid-generating fluid loss control additives, if desired. For example, in some instances, it may be desirable to add a strong base to keep the pH relatively high at some point in the process. This may be beneficial when using an ortho ether acid-generating fluid loss control additive, for example. Any base that is suitable for use in a subterranean operation that does not adversely affect other components therein may be used. Sodium hydroxide is a suitable example. Other well-known bases may also be used.

The acid-generating fluid loss control additives of the present invention should be included in a treatment fluid in an amount sufficient to achieve the desired degree of fluid loss control. In some embodiments, this will be from about 0.1% to about 15% of the composition and in certain preferred embodiments, from about 1% to about 5% of the composition. In some embodiments, wherein emulsion properties are desired, 60% to 90% may be used.

The fluid loss control additives of the present invention may be used in conjunction with any treatment fluid in which it is desirable to control fluid loss, e.g., a fracturing fluid, etc.

The treatment fluids that may be used in conjunction with the present invention generally comprise an aqueous base fluid, a gelling agent, and sometimes a breaker. In certain embodiments, the gelling agent may comprise a "crosslinked gelling agent," which is defined herein to mean that at least a portion of the gelling agent may be crosslinked by a crosslinking reaction comprising a crosslinking agent.

The aqueous base fluid used in the treatment fluids suitable for use with the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids. In certain embodiments, the density of the aqueous base fluid can be increased, among other purposes, to provide additional particle transport and suspension in the treatment fluids of the present invention. In certain embodiments, the pH of the aqueous base fluid may be adjusted (e.g., by a buffer or other pH adjusting agent), among other purposes, to activate a crosslinking agent, and/or to reduce the viscosity of the treatment fluid (e.g., activate a breaker, deactivate a crosslinking agent). In these embodiments, the pH may be adjusted to a specific level, which may depend on, among other factors, the types of gelling agents, crosslinking agents, and/or breakers included in the treatment fluid. One of ordinary skill in the art, with the benefit of this disclosure, will recognize when such density and/or pH adjustments are appropriate. One should be aware of this pH and its potential effect on the fluid loss control agents of the present invention.

The gelling agents utilized in the treatment fluids may comprise any polymeric material capable of increasing the viscosity of an aqueous fluid. In certain embodiments, the gelling agent may comprise polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring, synthetic, or a combination thereof. In certain embodiments, suitable gelling agents may comprise polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, diutan, scleroglucan, succinoglycan, and combinations thereof. In certain embodiments, the gelling agents comprise an organic carboxylated polymer, such as CMHPG. In certain embodiments, the derivatized cellulose is a cellulose grafted with an allyl or a vinyl monomer, such as those disclosed in U.S. Pat. Nos. 4,982,793; 5,067,565; and 5,122,549, the relevant disclosures of which are incorporated herein by reference. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used.

The gelling agent may be present in the treatment fluids in an amount sufficient to provide the desired viscosity. In some embodiments, the gelling agents may be present in an amount in the range of from about 0.12% to about 2.0% by weight of the treatment fluid. In certain embodiments, the gelling agents may be present in an amount in the range of from about 0.18% to about 0.72% by weight of the treatment fluid.

In those embodiments of the present invention wherein it is desirable to crosslink the gelling agent, the treatment fluid may comprise one or more crosslinking agents. The crosslinking agents may comprise a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or contact with some other substance. In some embodiments, the crosslinking agent may be delayed by encapsulation with a coating (e.g., a porous coating) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the pH of the treatment fluid, temperature, and/or the desired time for the crosslinking agent to crosslink the gelling agent molecules.

When included, suitable crosslinking agents may be present in the treatment fluids of the present invention in an amount sufficient to provide, inter alia, the desired degree of crosslinking between molecules of the gelling agent. In certain embodiments, the crosslinking agent may be present in the treatment fluids of the present invention in an amount in the range of from about 0.0005% to about 0.2% by weight of the treatment fluid. In certain embodiments, the crosslinking agent may be present in the treatment fluids of the present invention in an amount in the range of from about 0.001% to about 0.05% by weight of the treatment fluid. One of ordinary skill in the art, with the benefit of this disclosure, will recognize the appropriate amount of crosslinking agent to include in a treatment fluid of the present invention based on, among other things, the temperature conditions of a particular application, the type of gelling agents used, the molecular weight of the gelling agents, the desired degree of viscosification, and/or the pH of the treatment fluid.

Suitable breakers may include, but not limited to, sodium chlorite, sodium bromate, sodium persulfate, sodium peroxydisulfate, ammonium chlorite, ammonium bromate, ammonium persulfate, ammonium peroxydisulfate, potassium chlorite, potassium bromate, potassium persulfate, potassium peroxydisulfate, one or more oxidizable metal ions (i.e., a metal ion whose oxidation state can be increased by the removal of an electron, such as copper, cobalt, iron, manganese, vanadium), and the like. Examples of such additional breakers are described in U.S. Pat. No. 5,759,964 to Shuchart, et al., and U.S. Pat. No. 5,413,178 to Walker, et al., the relevant disclosures of which are herein incorporated by reference. In certain embodiments of the present invention, the breaker may be formulated to remain inactive until it is "activated" by, among other things, certain conditions in the fluid (e.g., pH, temperature, etc.) and/or contact with some other substance. In some embodiments, the breaker may be delayed by encapsulation with a coating (e.g., a porous coating through which the breaker may diffuse slowly, or a degradable coating that degrades down hole) that delays the release of the breaker until a desired time or place.

The breaker should be present in the treatment fluids in an amount sufficient to provide the desired viscosity reduction. The amount and composition of the breaker utilized in the present invention may depend upon a number of factors, including temperature, the type and/or amount of gelling agents used, the type and/or amount of crosslinking agent used, the pH of the treatment fluid, and the like. One skilled in the art, with the benefit of this disclosure, will recognize the amount and type of breaker suitable for a particular application of the present invention.

The treatment fluids optionally may comprise one or more additional additives known in the art, including, but not limited to, fluid loss control additives, gel stabilizers, gas, salts (e.g., KCl), pH-adjusting agents (e.g., buffers), corrosion inhibitors, dispersants, flocculants, acids, foaming agents, antifoaming agents, $H_2S$ scavengers, lubricants, oxygen scavengers, weighting agents, scale inhibitors, surfactants, catalysts, clay control agents, biocides, friction reducers, particulates (e.g., proppant particulates, gravel particulates), combinations thereof, and the like. For example, a gel stabilizer compromising sodium thiosulfate may be included in certain treatment fluids of the present invention. Individuals skilled in the art, with the benefit of this disclosure, will recognize the types of additives that may be suitable for a particular application of the present invention. For example, particulates may be included in the treatment fluids of the present invention in certain types of subterranean operations, including fracturing operations, gravel-packing operations, and the like.

To facilitate a better understanding of the present invention, the following examples of certain aspects of some embodiments are given. In no way should the following examples be read to limit, or define, the entire scope of the invention.

EXAMPLES

A base fluid was made according to a 30 lbs per 1000 gal of "WG-37" (a xanthan-based gelling agent available from Halliburton Energy Services, in Duncan, Okla.) ratio. The fluid was mixed in a Waring blender. The pH of the fluid was adjusted to 12 by the addition of a base for the crosslinker to be added later. 40 lbs per 1000 gal of 25 micron (median diameter) polylactic acid particles were added for building a filter cake. The following were then added: 2% by volume "WS-44," which is a surfactant that can be used to disperse the substantially immiscible fluid loss material in the fluid, and 5% by volume "AccuBreak PR," which is a substantially immiscible delayed acid generator that can improve fluid loss control. Both products are available from Halliburton Energy Services in Duncan Okla. Then, 0.5% by volume "CL-23" crosslinker (available from Halliburton Energy Services in Duncan Okla.) was added. The resultant fluid was allowed to crosslink. A fluid loss test was then performed in a Fann HPHT Cell with 500 psi differential pressure at 180° F. using a 5 micron Aloxit disk. Fluid loss was measured over time. FIG. 2 depicts the results. The bottom curve in FIG. 2 is shows the fluid loss data from the fluid described in this example above, with the fluid loss control material added. The top curve is the fluid loss data from a second fluid that was made in the same manner that did not include the "WS-44" and "AccuBreak PR" products described above.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee. Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of providing fluid loss control comprising:
   providing a treatment fluid;
   adding to the treatment fluid an acid-generating fluid loss control additive comprising an acid-generating component wherein the acid-generating fluid loss control additive forms small dispersed, discrete, substantially immiscible liquid drops in the treatment fluid; and
   thereafter, placing the treatment fluid into a subterranean formation.

2. The method of claim 1 wherein the drops are less than 500 microns.

3. The method of claim 1 wherein the at least one drop becomes incorporated in a porethroat of the subterranean formation.

4. The method of claim 1 wherein the treatment fluid is a fracturing fluid, a drill-in fluid, a gravel pack fluid, or a fluid loss control pill.

5. The method of claim 1 wherein the acid-generating component comprises at least one component selected from the group consisting of: an ester; an ortho ether; a poly(ortho ether); an aliphatic polyester; a lactide; a poly(lactide); a glycolide; a poly(glycolide); a lactone; a poly(s-caprolactone); a poly(hydroxybutyrate); an anhydride; a poly(anhydride); a poly(amino acid); and any derivative thereof.

6. The method of claim 1 wherein the treatment fluid comprises at least one additive selected from the group consisting of: a fluid loss control additive; a gel stabilizer; a gas; a salt; a pH-adjusting agent; a breaker; a corrosion inhibitor; a dispersant; a flocculant; an acid; a foaming agent; an antifoaming agent; an $H_2S$ scavenger; a lubricant; an oxygen scavenger; a weighting agent; a scale inhibitor; a surfactant; a catalyst; a clay control agent; a biocide; a friction reducer; a particulate; a proppant particulate; and a gravel particulate.

7. The method of claim 1 wherein the treatment fluid comprises an aqueous base fluid.

8. The method of claim 1 wherein the treatment fluid comprises a gelling agent or a crosslinked gelling agent.

9. The method of claim 1, wherein the acid-generating fluid loss control additive is added in liquid form to the treatment fluid.

10. A method comprising:
    providing a fracturing fluid that comprises an aqueous base fluid, a gelling agent, proppant particulates, and at least a plurality of small dispersed, discrete, substantially immiscible liquid drops of acid-generating fluid loss control additives; and
    thereafter, placing the fracturing fluid into a subterranean formation at a pressure sufficient to create or enhance a fracture therein.

11. The method of claim 10 wherein the drops are less than 500 microns.

12. The method of claim 10 wherein the at least one drop becomes incorporated in a porethroat of the subterranean formation.

13. The method of claim 10 wherein the acid-generating component comprises at least one component selected from the group consisting of: an ester; an ortho ether; a poly(ortho ether); an aliphatic polyester; a lactide; a poly(lactide); a glycolide; a poly(glycolide); a lactone; a poly(-caprolactone); a poly(hydroxybutyrate); an anhydride; a poly(anhydride); a poly(amino acid); and any derivative thereof.

14. The method of claim 10 wherein the fracturing fluid comprises at least one additive selected from the group consisting of: a fluid loss control additive; a gel stabilizer; a gas; a salt; a pH-adjusting agent; a breaker; a corrosion inhibitor; a dispersant; a flocculant; an acid; a foaming agent; an antifoaming agent; an $H_2S$ scavenger; a lubricant; an oxygen scavenger; a weighting agent; a scale inhibitor; a surfactant; a catalyst; a clay control agent; a biocide; a friction reducer; a particulate; and a gravel particulate.

* * * * *